United States Patent [19]

Yamazaki

[11] Patent Number: 4,795,858
[45] Date of Patent: Jan. 3, 1989

[54] DEVICE FOR DETERMINING POSITION COORDINATES OF POINTS ON A SURFACE

[75] Inventor: Daizou Yamazaki, Tokyo, Japan

[73] Assignee: Graphtec Kabushiki Kaisha, Tokyo, Japan

[21] Appl. No.: 178,533

[22] Filed: Apr. 7, 1988

[30] Foreign Application Priority Data

May 29, 1987 [JP] Japan ................ 62-135937

[51] Int. Cl.⁴ .............................. G08C 21/00
[52] U.S. Cl. ................................ 178/19
[58] Field of Search ............ 178/18, 19; 340/706, 340/709, 710

[56] References Cited

U.S. PATENT DOCUMENTS 4,740,660 4/1988 Kimura ............... 178/19

Primary Examiner—Stafford D. Schreyer
Attorney, Agent, or Firm—Spensley Horn Jubas & Lubitz

[57] ABSTRACT

A device for determining position coordinates of points on a surface, have a cursor structure, a grid structure, and a signal processor. The cursor structure has a cursor coil and a signal generator to impress a reference phase voltage to the coil. Voltages induced from the cursor coil in conductors of the grid structure are processed in the signal processor to produce a position dependent phase voltage. For the signal processor, reference phase pulses are obtained from a voltage induced in an auxiliary grid conductor provided in the grid structure.

4 Claims, 8 Drawing Sheets

251: auxiliary grid conductor

DEVICE FOR DETERMINING POSITION COORDINATES OF POINTS ON A SURFACE

BACKGROUND OF THE INVENTION

This invention relates to a device for determining position coordinates of points on a surface. Such a device is often called a digitizer, and this name will hereafter be used for the device.

The prior art of this invention is disclosed in a U.S. Pat. No. 3,647,963 entitled as AUTOMATIC COORDINATE DETERMINING DEVICE. In this prior art, a digitizer comprises a conducting grid structure, a cursor structure having a circular conducting loop element to be moved across the surface of the grid structure, a signal generator which transmits an alternating current excitation signal to the cursor structure, and a signal processor which processes the voltage signal induced in the grid structure. In this digitizer, a coaxial cable must be connected to the cursor to transmit the alternating current excitation signal from the signal generator. In another design of a digitizer, the alternating current excitation signal is applied to the grid structure, and a voltage induced in the cursor coil is connected to the signal processor. In such a design, a coaxial cable must be connected to the cursor to transmit the induced voltage to the signal processor.

Succeeding to the U.S. Pat. No. 3,647,963, there have been several important disclosures including U.S. Pat. No. 3,735,044 entitled as COORDINATE DETERMINING DEVICE EMPLOYING A SLOWLY VARYING DIFFERENCE SIGNAL TO DETERMINE APPROXIMATE CURSOR POSITION. In all these disclosures, the cursor structure has a coaxial cable attached to the cursor.

This coaxial cable attached to the cursor presents an impediment to the maneuverability of the cursor displacement. What is worse, there is a danger of a broken wire accident.

From these reasons, cordless cursor type digitizers which have not a cable connecting a cursor to a digitizer main unit, have been developed and disclosed. In U.S. Pat. No. 4,205,199 a cursor is composed of an input-pen having a magnetic tip to change magnetic permeability of a desired point on a digitizer tablet. For such a cursor, there is not a signal to be transmitted between the cursor and the digitizer main unit. Therefore, this cursor is a cordless cursor.

In the invention disclosed in U.S. Pat. No. 4,451,678, a signal generator and a battery are built-in in a cursor structure. But, this cursor can fulfill its duty when it can induce voltages in grid conductors, and there is no need of an information of a phase of a voltage impressed on the cursor coil (this phase will be called a reference phase) to be used for signal processing. There are several other inventions as disclosed in U.S. Pat. Nos. 4,088,842; 4,497,977; 4,672,154; 4,678,870; 4,697,050 on cordless digitizers in which, similar to the invention disclosed in U.S. Pat. No. 4,451,698, a reference phase information is not necessary in a signal processor.

But, in a type of digitizers as disclosed in U.S. Pat. Nos. 4,185,165; 4,210,775; 46692,568, in which a reference phase signal is used for signal processing, the reference phase signal is transmitted by a cable connected between a cursor structure and a digitizer main unit.

A Japanese Patent Application No. 108685/85 (Provisional Publication No. 267120/86), which is an improvement of the U.S. Pat. No. 4,692,568, discloses a cordless cursor type digitizer. In this cordless cursor type digitizer, conductive lines are scanned in a predetermined time sequence, and as it is known beforehand that a reference phase signal is obtained in an early phase of the scanning, there is no need for transmitting a reference phase signal between a cursor coil and a digitizer main unit.

In a type of digitizers as disclosed in U.S. Pat. No. 3,647,963, in which a cursor coil is placed at an optional point on a grid structure, a reference phase signal can not be obtained by a method similar to the method disclosed by the Japanese Patent Application No. 108685/85.

BRIEF DESCRIPTION OF THE INVENTION

Therefore, an object of the present invention is to provide a cordless cursor type digitizer, in which a reference phase signal is obtained in a signal processor. In the present invention, a signal generator is incorporated in a cursor structure, and auxiliary grid conductors are formed in a grid structure. A reference phase signal for the signal processor is obtained from a voltage induced in the auxiliary grid conductor.

In general, a voltage induced in an auxiliary grid conductor may be in the same phase or in the opposite phase to the reference phase voltage, and another object of this invention is to obtain the reference phase signal from voltages induced in the auxiliary grid conductors. For this purpose, a counter is provided for counting a high frequency pulse train to generate a pulse train which has a same frequency with the reference phase signal. At an initialization, the counter is reset by pulses which are in the same phase with the reference phase, and generates a gate signal which inhibits the pass of the pulses which are in the opposite phase to the reference phase voltage. After the initialization, the counter is reset by pulses which pass the gate, and thus, the signal processor of this invention remembers, by means of the counter, the instruction given at the initialization, and reproduces the reference phase from pulses which are 0° and 180° phase with the reference phase.

PREFERRED EMBODIMENT

Figure 1:
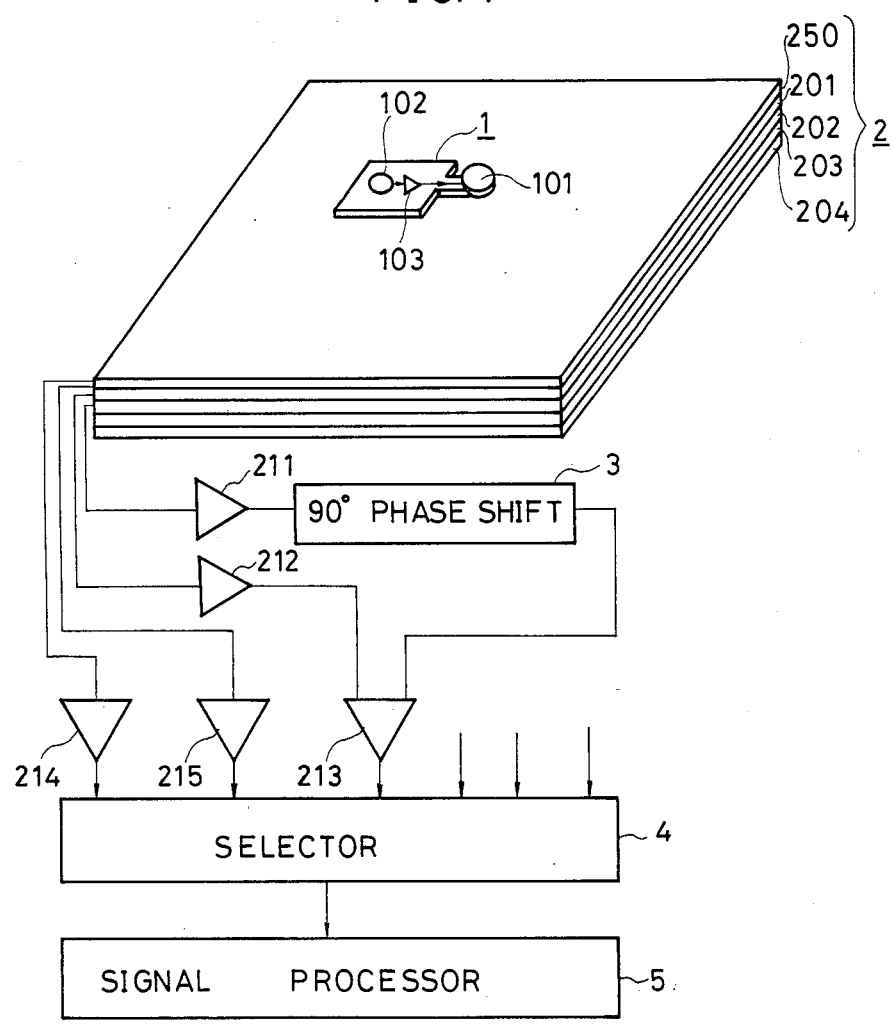
FIG. 1 represents a block diagram of an embodiment of this invention.

Referring now to FIG. 1, a cursor structure 1 of this invention comprises a cursor coil 101, a signal generator 102, and an amplifier 103, together with a battery type power supply (not shown in the drawing). A reference phase voltage is generated in the signal generator 102, amplified by the amplifier 103, and the output of the amplifier 103 flows a reference phase current in the cursor coil 101. And thus, the cursor structure 1 has no attached cable. A grid structure 2 of this invention has an auxiliary grid sheet 250 in addition to position determination grid sheets 201~204. The grid sheets 201, 202 are for the position determination in X direction, and grid sheets 203, 204 are for the position determination in Y direction. From these four grid sheets, 201~204, we obtain a precise cursor position in relation to a grid conductor spacing. In order to obtain a position information as to the number of the grid conductor to which the precise cursor position is referred, four more position determination grid sheets must be provided as disclosed in U.S. Pat. No. 3,735,044.

Figure 2:
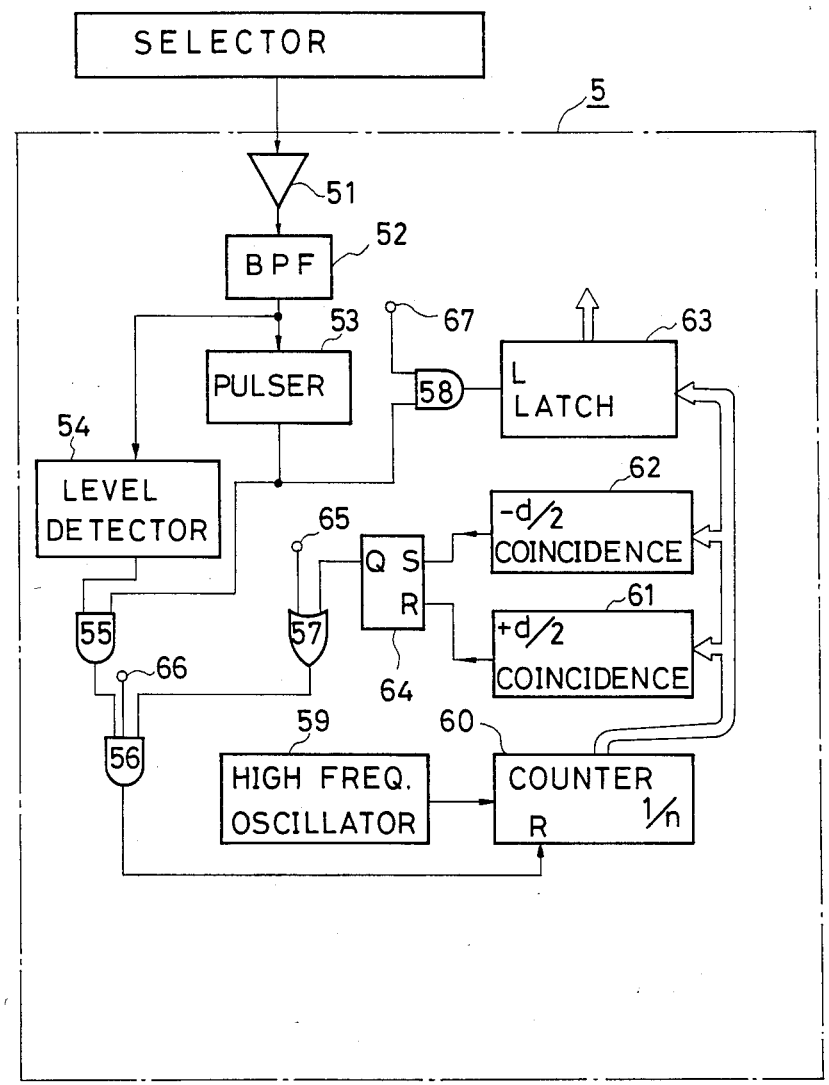
FIG. 2 is a block diagram of an embodiment of a signal procesor which is shown in FIG. 1.

In FIG. 1, 211, 212, 213, 214, 215 are respectively amplifiers, and 3 is a phase shifter which shifts an input voltage by 90 degrees. 4 is a selector which selects an input to a signal processor shown in FIG. 2.

Voltages induced in auxiliary grid conductors in the auxiliary grid sheet 250 are amplified by the amplifiers 214, 215 to be delivered to the selector 4 as reference phase voltages. A voltage induced in the grid sheet 202 is phase-shifted by 90 degrees in the phase-shifter 3, and is combined with a voltage induced in the grid sheet 201 to produce a signal which has a phase-angle proportional to a precise cursor position in relation to a grid conductor spacing in X-direction. A signal which has a phase-angle proportional to a precise cursor position in relation to a grid conductor spacing in Y-direction is produced by a similar circuitry as indicated by 211, 212, 213, and 3 from grid sheets 203 and 204 (these circuits are not shown in the drawing). Two more sets of such circuitry with four more position determination grid sheets are to be provided when the number of the reference grid conductor is to be determined as disclosed by U.S. Pat. No. 3,735,044. These circuitry are not shown in the drawing, although input lines to the selector 4 from such circuitry are shown.

The operation of the selector 4 is program-controlled by a host computer (not shown in the drawing), and the output of the selector 4 is processed in just a same way as in a heretofore known signal processing apparatus. The signal processing will be explained in a later paragraph, in connection with FIG. 2.

Figure 3:
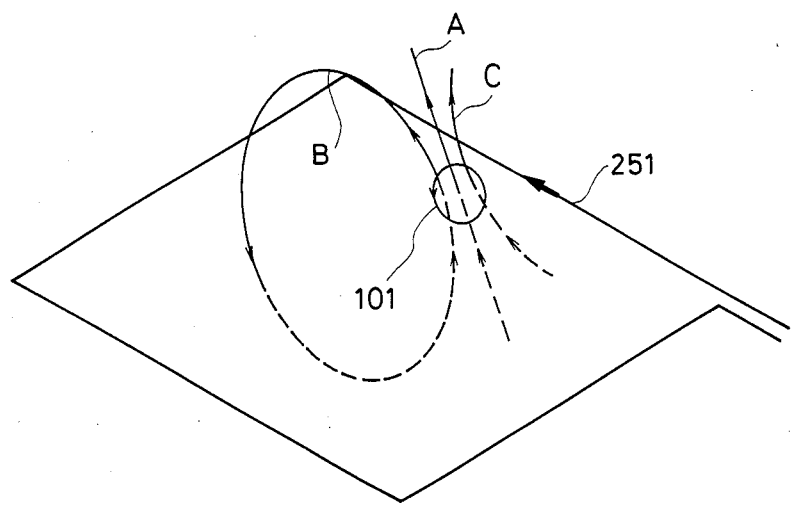
FIG. 3, FIG. 4 and FIG. 5 show magnetic flux linkage between a cursor coil and an auxiliary grid conductor.
Figure 4:
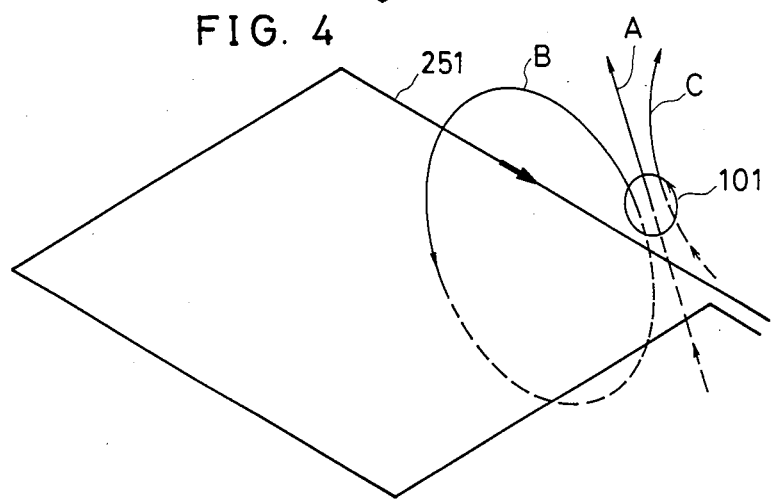
Figure 5:
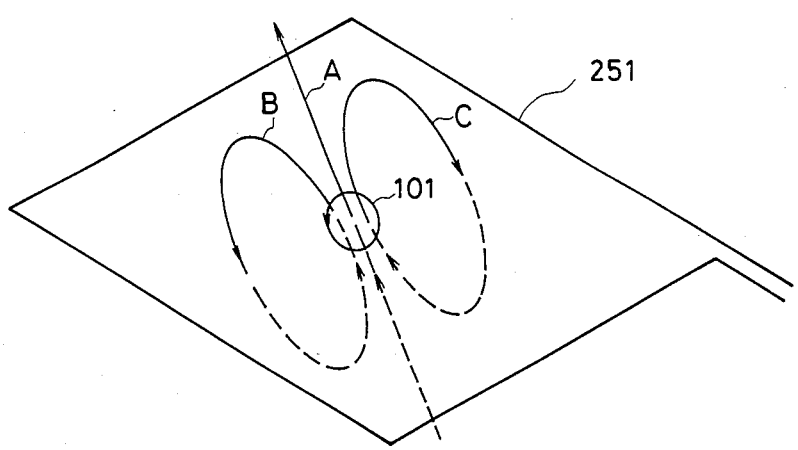

FIG. 3, FIG. 4, FIG. 5 illustrate magnetic flux linkage between the cursor coil 101 and an auxiliary grid conductor 251. In these drawings, an instant is supposed when magnetic flux lines (indicated by A, B, C in the drawings) through an area enclosed by the cursor coil 101 are going upward. In FIG. 3, the cursor coil 101 is in the area enclosed by the grid conductor 251, and all the upward going flux lines are included in the area enclosed by the grid conductor 251. But some part of the returning flux lines (as indicated by line B in FIG. 3) goes downward through an area enclosed by the grid conductor 251. The resultant flux linked with the grid conductor 251, is in the same direction with the flux generated by the cursor coil 101. In FIG. 4, the cursor coil 101 is out of the area enclosed by the grid conductor 251, and the resultant flux linked with the grid conductor 251 is in the opposite direction with the flux generated by the cursor coil 101. Thus, the voltage induced in the grid conductor 251 in FIG. 3 is in a same phase with the voltage applied to the cursor coil 101, and the voltage induced in the grid conductor 25 in FIG. 4 is in the opposite phase to the voltage applied to the cursor coil 101.

In FIG. 5, the cursor coil 101 is situated in a position which is not near to any portion of the grid conductor 251. Most of the lines of flux outgoing through the area enclosed by the cursor coil 101 come back again penetrating the area enclosed by the grid conductor 251 in a reversed direction cancelling the outgoing flux. Thus a resultant total flux linked with the conductor 251 becomes very small, although the direction of the linkage is in a same direction with the flux linkage to the cursor coil. In this condition, the amplitude of the voltage induced in the grid conductor 251 may not be sufficient to be used as a reference phase voltage. In such a case, another conductor (or conductors) must be provided in the auxiliary grid sheet 250.

Figure 6:
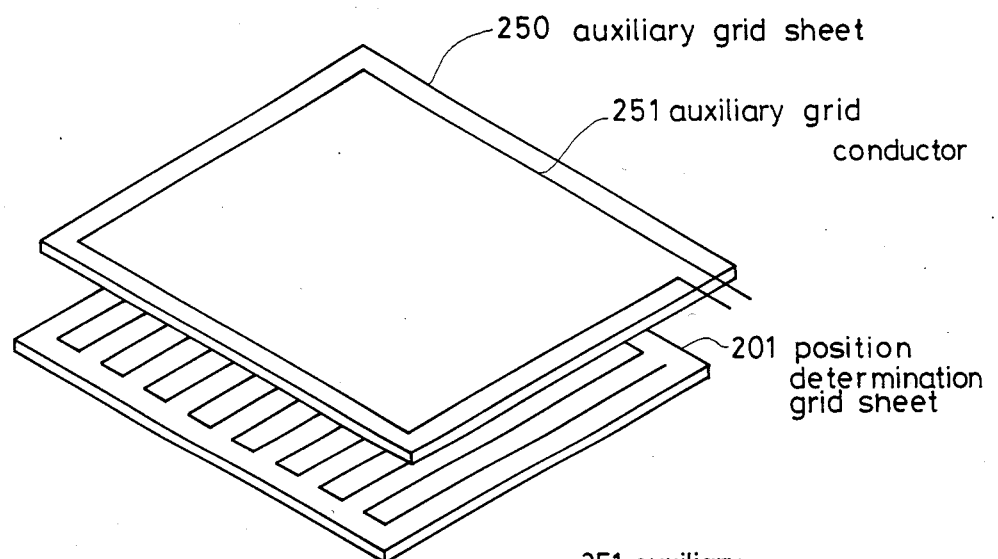
FIG. 6 is a perspective view of an embodiment of an auxiliary grid conductor of this invention.

FIG. 6 shows an embodiment of an auxiliary grid sheet of this invention, 251 being an auxiliary grid conductor as shown in FIG. 3~FIG. 5. The voltage induced in this auxiliary grid conductor 251 is, at any operating position of the cursor coil 101, in the same phase with the voltage applied to the cursor coil 101, and the voltage induced in the auxiliary grid conductor 251 of FIG. 6 can always be used as a reference phase voltage in the signal processor. But, for a large size digitizer, the amplitude may not be sufficient when the cursor coil 101 is placed in a position which is not near to any portion of the grid conductor 251.

Figure 7:
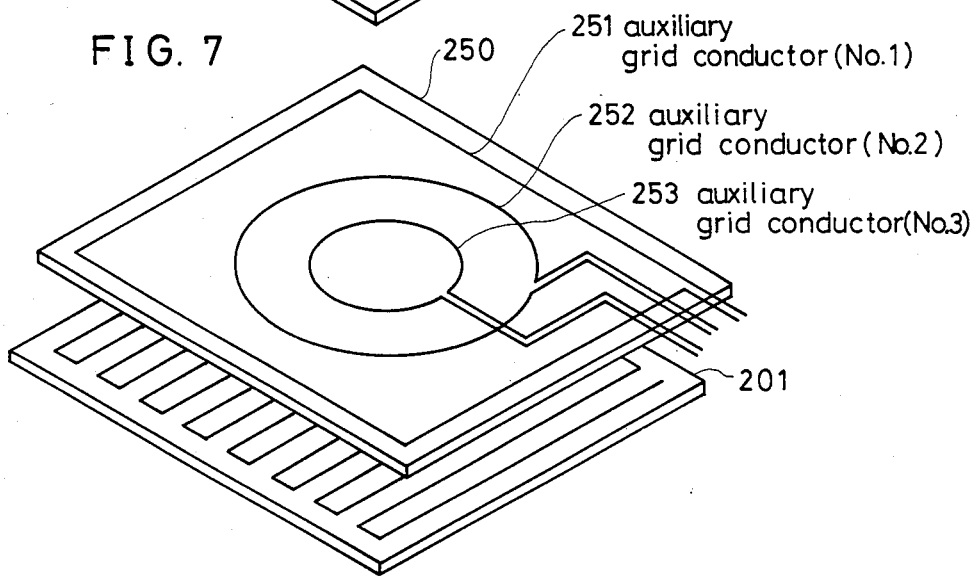
FIG. 7 is a perspective view of another embodiment of auxiliary grid conductors of this invention.

FIG. 7 shows another embodiment of an auxiliary grid sheet of this invention, 251, 252, 253 being respectively auxiliary grid conductors No. 1, No. 2, No. 3. The grid conductor No. 1 251 is a conductor similar to that shown in FIG. 6. The grid conductor No. 2 252 is used when the position of the cursor coil 101 is near to the center of the area enclosed by the grid conductor No. 1 251, and the grid conductor No. 3 253 is used when the position of the cursor coil 101 is near to the center of the area enclosed by the grid conductor No. 2 252. Voltages induced in these grid conductors 251, 252, 253 are successively connected to the signal processor 5 through the connector 4.

Returning now to FIG. 2, a signal processor 5 of this invention comprises an amplifier 51, a band pass filter (BPF) 52, a pulser 53, a signal level detector 54, gates 55, 56, 57, 58, a high frequency oscillator 59, a counter 60, coincidence detectors 61, 62, a latch 63, and a set-reset type flipflop 64. Control signals from the host computer is delivered to gate terminals 65, 66, 67.

The host computer controls the switching in the selector 4, and connects the outputs of amplifiers 213, 214, 215, . . . to the selector 4 in a predetermined sequential cycle. A voltage signal at the output of the amplifier 51 usually includes distorsions and noises. These distorsions and noises are attenuated by the BPF 52, and a pure sine-wave voltage is delivered to the pulser 53. The frequency of this sine-wave voltage is, for example, 3 kHz.

A voltage induced in an auxiliary grid conductor may not have a sufficient amplitude to be used as a signal. The level detector 54 detects an amplitude level of an output of BPF 52, and rejects a weak signal by the gate 55.

When the frequency of the signal voltage is 3 kHz, the frequency of the output of the high frequency oscillator 59 is, for example, 3 MHz, the frequency ratio being 1000. The modulo of the counter 60 is usually selected to be equal to this ratio (1000), and therefore, the counter 60 returns to its original phase after a complete cycle of the signal voltage of 3 kHz.

At a system initialization, the cursor coil 101 is placed in a position where an induced voltage which is in a same phase with the reference phase and have a sufficient amplitude is delivered from the amplifier 214. The host computer connects the output of the amplifier 214 to the input of the amplifier 51, waits a predetermined time interval in which the switching transient is attenuated, and connects logic [1] signal to terminals 65 and 66. The output of the pulser 53 passes through the gate 55 and 56 to reset the counter 60. The coincidence detectors 61, 62 generate pulses when the counter 60 is at a count phase of $+d/2$ count and $-d/2$ count respectively (for a numerical example $d=100$ is assumed in a modulo $n=1000$ counter). The flipflop 64 is set by pulses from the coincidence detector 62 and is reset by pulses from the coincidence detector 61, and the output of the flipflop 64 is a gate signal which is at logic [1] during $-50$ ($-d/2$) and $+50$ ($+d/2$). After the system initialization, the signal at the terminal 65 is held at logic [0] and pulses which are outside of the gate signal produced by the flipflop 64 are inhibited at the gate 56.

In a running mode of the digitizer, the cursor coil 101 is placed at an arbitrary position, and the host computer scans the outputs of the amplifiers 214, 215, 213, . . . . When the output of the amplifier 214 has not a sufficient amplitude, this output is blocked at the gate 55 and is not used in the signal processor 5. When this output is not in phase with the reference phase, this output is blocked at the gate 66, although a logic [1] signal is at the terminal 66. In the second step of the scanning input, the host computer connects the output of the amplifier 215 to the input of the amplifier 51, waits the predetermined time interval, and connects logic [1] signal to the terminal 66. Pulses from the pulser 53 pass through the gate 55 when the input signal to the level detector 54 has a sufficient amplitude, and pass through the gate 56 when pulses are in the gate produced by the flipflop 64. Pulses which pass the gate 56 reset the counter 60. It will be said that, for a signal processor 5 as shown by FIG. 2, there must be at least one auxiliary grid conductor which generates a voltage of a sufficient amplitude and in a same phase with the reference phase for an arbitrary position of the cursor coil 101.

In the third step of the scanning input, the host computer connects the output of the amplifier 213 to the input of the amplifier 51, waits the predetermined time interval, and connects logic [1] signal to the terminal 67. The latch 63 latches the count phase of the counter 60 at an instant when a pulse from the gate 58 is delivered to the loading signal terminal L of the latch 63. In this way, the data stored in the latch 63 represents a phase difference of the output of the amplifier 213 to the reference phase. And this phase difference corresponds to a precise cursor position in relation to a grid conductor spacing in X-direction.

There are four (or at least two) variable phase input signals connected to the selector 4, and for each of these input signals, a latch and a gate are provided, although a single latch 63 and a single gate 58 are shown in FIG. 2.

From a set of data stored in these latches, the host computer determines a position coordinate of a point. In FIG. 2, all the components of the signal processor 5 are illustrated as hardware circuits, but a large part of the signal processor 5 can be composed by a program control in the host computer.

Figure 9:
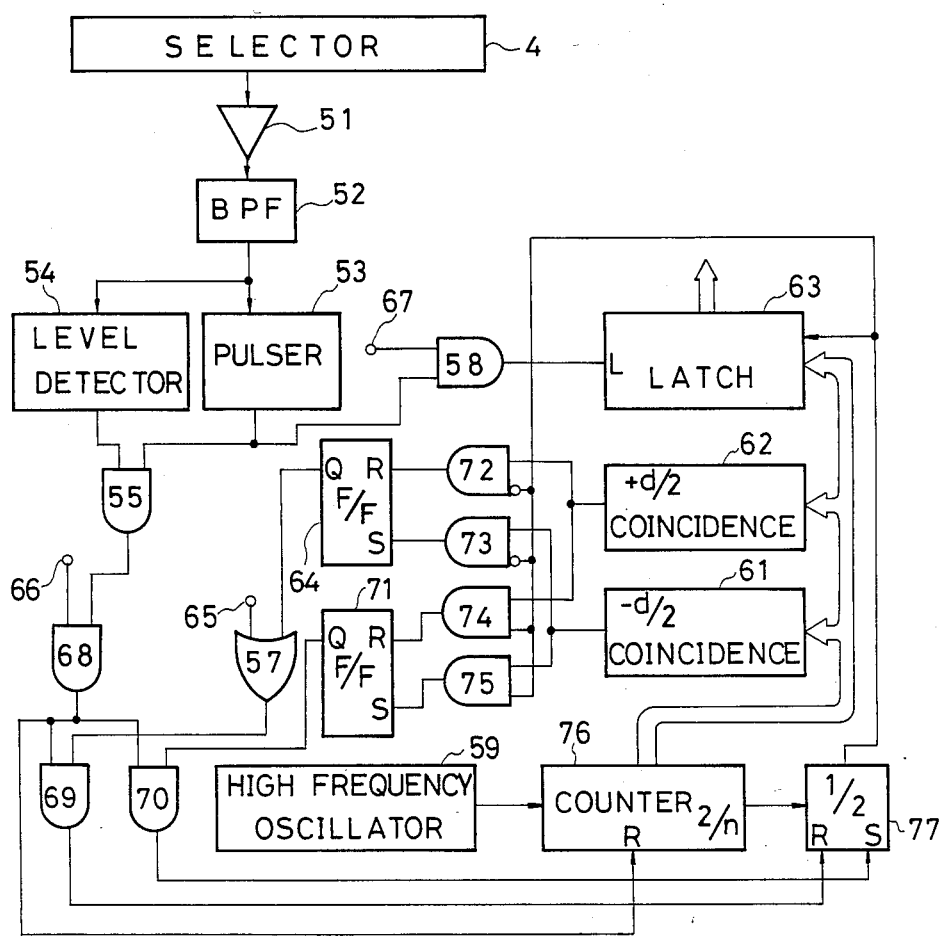
FIG. 9 is a block diagram of a signal processor which is shown in FIG. 8.
Figure 10:
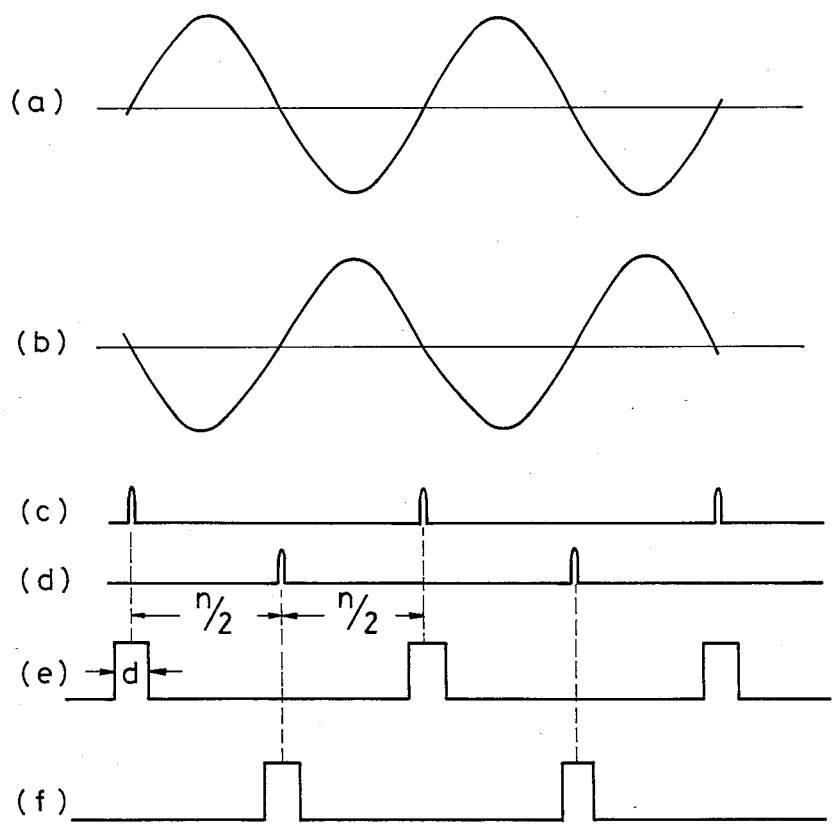
FIG. 10 shows waveforms of signals in FIG. 9.

Waveforms at the output of the BPF 51, the pulser 53, and the flipflop 64 are shown in FIG. 10, as (a), (b), (c), (e), although FIG. 10 shows wave-forms of signals in FIG. 9, and will be explained in later paragraphs. In an embodiment as shown in FIG. 2, pulses (shown in (d) of FIG. 10) generated from a voltage (shown in (b) of FIG. 10) having an opposite phase to the reference phase, are blocked at the gate 56. But in another embodiment, such pulses can be passed through another gate (shown in (f) of FIG. 10) to reset the counter 60 to a count n/2 phase. This embodiment where a voltage having an opposite phase to the reference phase is also used to prodcce the reference phase, will be explained in connection with FIG. 9.

In a heretofore known digitizer, in which a signal generator is in a signal processor, the output of the high frequency oscillator is frequency divided to produce the signal frequency, and therefore the signal frequency is synchronized with the high frequency. In this invention, the signal frequency is generated independently, and may have a frequency error between a submultiple of the high frequency. But this frequency error can easily be kept small enough to obtain a sufficient accuracy in the position determination.

And it is easy to synchronize the high frequency oscillator 59, when necessary, by the output of the amplifier 214.

Figure 8:
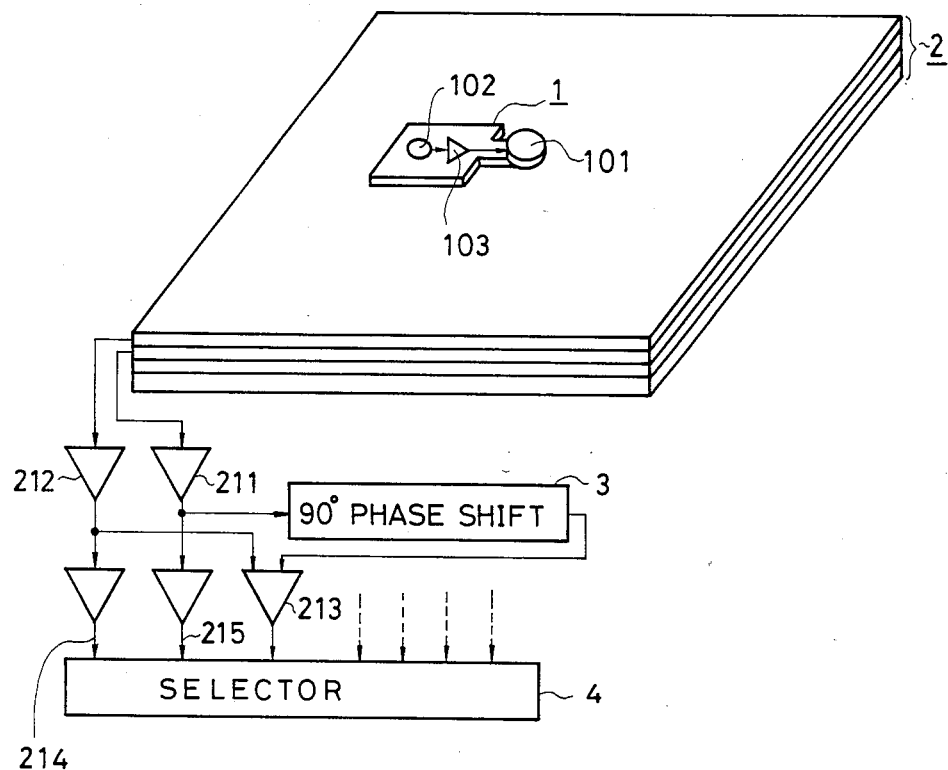
FIG. 8 is a block diagram of another embodiment of this invention.

Referring now to FIG. 8 and FIG. 9, another embodiment of this invention is shown in which a reference phase voltage is obtained from voltages induced in conductors in position determination grid sheets. In these drawings a same numeral indicates a same or a corresponding part shown in FIG. 1 and FIG. 2. In FIG. 9, 68, 69, 70, 72, 73, 74, 75 are gates 71 is a flipflop, 76 is a counter (modulo n/2) and 77 is another counter (modulo 2).

An output of the amplifier 212 is represented by $A\cos x \sin \omega t$, while an output of the amplifier 211 is represented by $A\sin x \sin \omega t$ where x is a position variable, t is the time, $\omega$ is the signal frequency (angular), and $\omega t$ is the reference phase. The output of the amplifier 211 is phase-shifted by 90° and is combined with the output of the amplifier 212 to produce a voltage represented by $A\sin(\omega t + x)$ at the output of the amplifier 213. These voltages which have $A\cos x$ and $A\sin x$ amplitude respectively are used for the reference phase voltage. It is clear that at least one of these two voltages has a sufficient amplitude to pass the gate 55. When the host computer connects the output of the amplifier 214 or 215, a logic [1] signal is present at the terminal 66 to pass the pulses through the gate 68 from the gate 55. The pulses which pass the gate 68 may be in a same phase or in an opposite phase to the reference phase Two counters 76 and 77 combined are equivalent to the counter 60 in FIG. 2, and coincidence detectors 61, 62 set and reset the flipflops 64 and 71 through gates 72~75 to generate two gate signals which are at logic [1] during $-d/2$ to $+d/2$ and during $n/2-d/2$ to $n/2+d/2$ respectively.

Referring to FIG. 10, (a) and (b) show waveforms at an output of the BPF 52, (c) and (d) show pulses at an output of the gate 68, (e) and (f) show gate waveforms of the flipflops 64 and 71.

The pulses which pass the gate 68 reset the couneer 76. Pulses which pass the gate 69 (0° phase pulses) reset the counter 77, whereas pulses which pass the gate 70 set the counter 77. Thus pulses which are generated from the output of amplifiers 214 or 215 synchronize the counters 76 and 77.

At a system initialization, the cursor coil 101 is placed at x=0 (where cosx is maximum), the amplifier 213 is connected to the amplifier 51, and a logic [1] signal is connected at terminals 66, 65 while a logic [0] signal is connected to the terminal 67.

In the foregoing explanations, a particular numerical example is described, but it must be understood that this invention is not restricted by a particular numerical example.

I claim:

1. A device for determining position coordinates of points on a surface; comprising a cursor structure which generates an electro-magnetic field of a signal frequency, a grid structure which is coupled to the electromagnetic field generated by said cursor structure, and a signal processor where the voltages induced in said grid structure being processed to determine a relative position of said cursor on a surface of said grid structure; characterized in that:

said cursor structure including a signal generator to generate a voltage of said signal frequency together with a battery type power supply, said voltage of said signal frequency being impressed on a cursor coil of said cursor structure;

and said grid structure including an auxiliary grid sheet besides position determination grid sheets, only one auxiliary grid conductor being provided in said auxiliary grid sheet, at any operating position of said cursor coil on said auxiliary grid sheet, said only one grid conductor generating an induced voltage of sufficient amplitude and in phase with said voltage impressed on said cursor coil; and said signal voltage induced in said auxiliary grid conductor being used as a reference phase signal in said signal processor.

2. A device for determining position coordinates of points on a surface; comprising a cursor structure which generates an electro-magnetic field of a signal frequency, a grid structure which is coupled to the electromagnetic field generated by said cursor structure, and a signal processor where the voltages induced in said grid structure being processed to determine a relative position of said cursor on a surface of said grid structure; characterized in that:

said cursor structure including a signal generator to generate a voltage of said signal frequency together with a battery type power supply, said voltage of said signal frequency being impressed on a cursor coil of said cursor structure;

said grid structure including an auxiliary grid sheet besides position determination grid sheets, a plural number of auxiliary grid conductors being provided in said auxiliary grid sheet, at any operating position of said cursor coil on said auxiliary grid sheet, at least one auxiliary grid conductor in said plural number of grid conductors generating an induced voltage of sufficient amplitude and in phase with said voltage impressed on said cursor coil, voltages induced in auxiliary grid conductors on said auxiliary grid sheet being successively connected to said signal processor;

said signal processor including a counter which counts high frequency pulses from a high frequency oscillator to produce said signal frequency in a whole count cycle of said counter, means for generating a gate signal having a relatively short time interval including a count zero phase of said counter, means for selecting pulses which have sufficient amplitude and pass said gate from pulses generated by said voltages induced in said auxiliary grid conductors, means for resetting said counter to said count zero phase by said selected pulses, said count zero phase of said counter being used as a reference phase in said signal processor.

3. A device for determining position coordinates of points on a surface; comprising a cursor structure which generates an electro-magnetic field of a signal frequency, a grid structure which is coupled to the electromagnetic field generated by said cursor structure, and a signal processor where the voltages induced in said grid structure being processed to determine a relative position of said cursor on a surface of said grid structure; characterized in that:

said cursor structure including a signal generator to generate a voltage of said signal frequency together with a battery type power supply, said voltage of said signal frequency being impressed on a cursor coil of said cursor structure;

said grid structure including an auxiliary grid sheet besides position determination grid sheets, a plural number of auxiliary grid conductors being provided in said auxiliary grid sheet, at any operating position of said cursor coil on said auxiliary grid sheet, at least one auxiliary grid conductor in said plural number of grid conductors generating an induced voltage of sufficient amplitude, voltages induced in auxiliary grid conductors on said auxiliary grid sheet being successively connected to said signal processor;

said signal processor including a counter which counts high frequency pulses from a high frequency oscillator to produce said signal frequency in a whole count cycle of said counter, means for generating a first gate signal having a relatively short time interval including a count zero phase of said counter, means for generating a second gate signal having a relatively short time interval including a count n/2 phase (n being the total count of said counter) of said counter, means for selecting first group of pulses which have sufficient amplitude and pass said first gate and second group of pulses which have sufficient amplitude and pass said second gate from pulses generated by said voltages induced in said auxiliary grid conductors, means for resetting said counter to said count zero phase by said first group of pulses and to said count n/2 phase by said second group of pulses, said count zero phase of said counter being used as a reference phase signal in said signal processor.

4. A device for determining position coordinates of points on a surface; comprising a cursor structure which generates an electro-magnetic field of a signal frequency, a grid structure which is coupled to the electromagnetic field generated by said cursor structure, and a signal processor where the voltage induced in said grid structure being processed to determine a relative position of said cursor on a surface of said grid structure; characterized in that:

said cursor structure including a signal generator to generate a voltage of said signal frequency together with a battery type power supply, said voltage of said signal frequency being impressed on a cursor coil of said cursor structure;

from position determination grid sheets a pair of voltages is connected to said signal processor, said pair of voltages being represented by $A\cos x \sin \omega t$ and Asinxsinωt respectively, where A being a constant, x being a position variable, ω being said signal frequency (angular frequency), t being time;

said signal processor including a counter which counts high frequency pulses from a high frequency oscillator to produce said signal frequency in a whole count cycle of said counter, means for generating a first gate signal having a relatively short time interval including a count zero phase of said counter, means for generating a second gate signal having a relatively short time interval including a count n/2 phase (n being the total count of said counter) of said counter, means for selecting first group of pulses which have sufficient amplitude and pass said first gate and second group of pulses which have sufficient amplitude and pass said second gate from pulses generated by said pair of voltages, means for resetting said counter to said count zero phase by said first group of pulses and to said count n/2 phase by said second group of pulses, said count zero phase of said counter being used as a reference phase signal in said signal processor.

* * * * *